United States Patent [19]
Shimizu

[11] Patent Number: 6,006,012
[45] Date of Patent: *Dec. 21, 1999

[54] PRINT CONTROL APPARATUS AND METHOD FOR EXECUTING A JAM RECOVERY FUNCTION WHEN A JAM IS DETECTED DURING PRINTING ON A FRONT SIDE OF A RECORDING MEDIUM

[75] Inventor: Masaaki Shimizu, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/631,106

[22] Filed: Apr. 12, 1996

[30] Foreign Application Priority Data

Apr. 17, 1995 [JP] Japan ................................. 7-115103
Mar. 25, 1996 [JP] Japan ................................. 6-068041

[51] Int. Cl.$^6$ .................................................. H04N 1/32
[52] U.S. Cl. ........................ 395/113; 395/114; 358/296; 358/401; 358/437; 355/23; 355/24; 355/407

[58] Field of Search ................................. 395/113, 867, 395/800.4, 114; 358/296, 401, 437; 355/23–24, 407; 399/18, 21, 364, 374

[56] References Cited

U.S. PATENT DOCUMENTS 5,148,284 9/1992 Nishikawa et al. ..................... 358/296
5,257,035 10/1993 Funahashi et al. ..................... 346/1.1

*Primary Examiner*—Scott Rogers
*Assistant Examiner*—Lance W. Sealey
*Attorney, Agent, or Firm*—Fitzpatrick, Cella, Harper & Scinto

[57] ABSTRACT

A print control apparatus receives front-side data and back-side data from an external apparatus and causes a printer to print the received front-side and back-side data on front and back sides of a recording medium. The print control apparatus includes a unit for detecting a jam in the printer. It also includes a unit for executing a jam recovery function if the detection unit detects a jam during printing on the front side, and executing no jam recovery function if the detection unit detects a jam during printing on the back side.

40 Claims, 18 Drawing Sheets

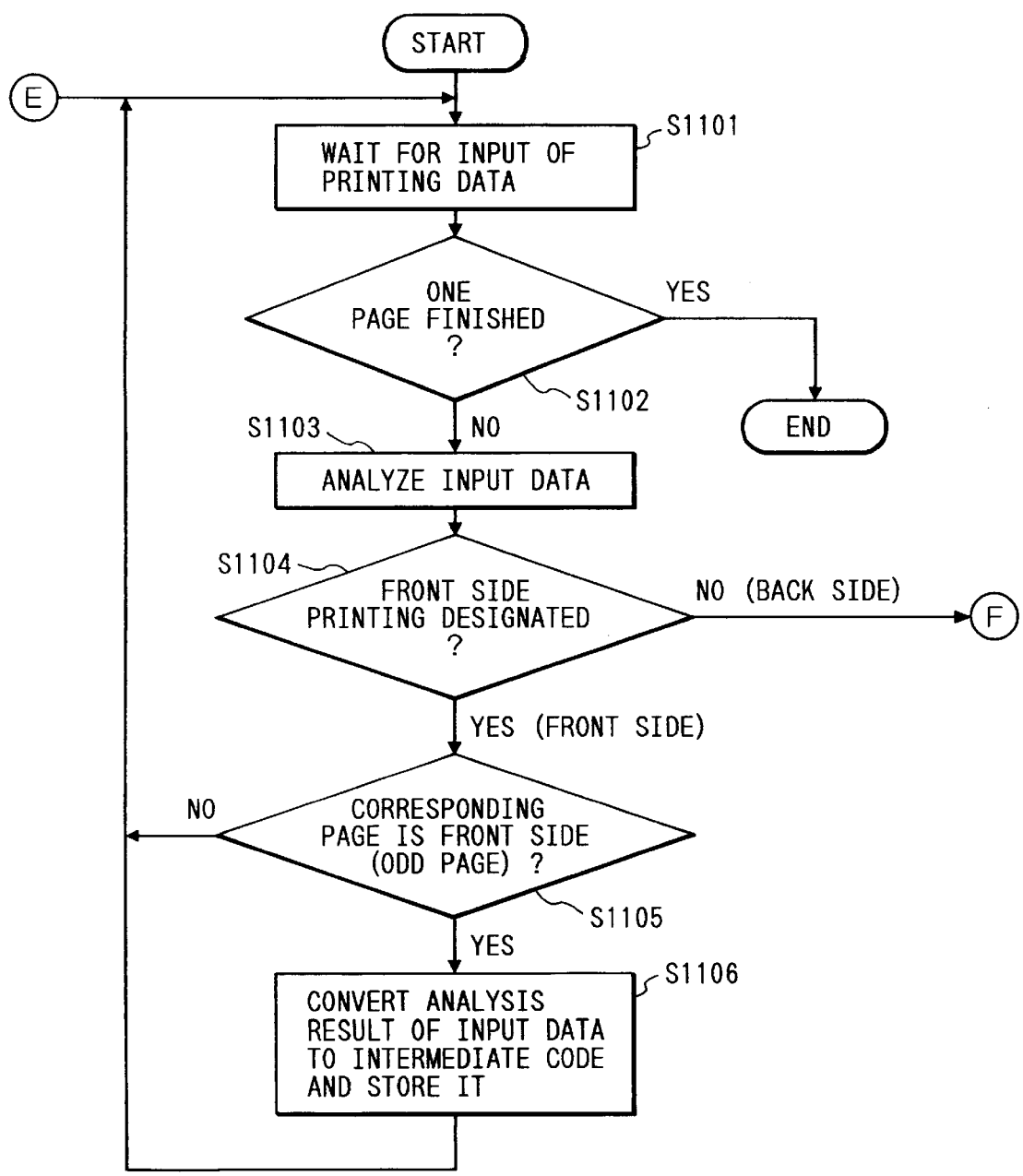

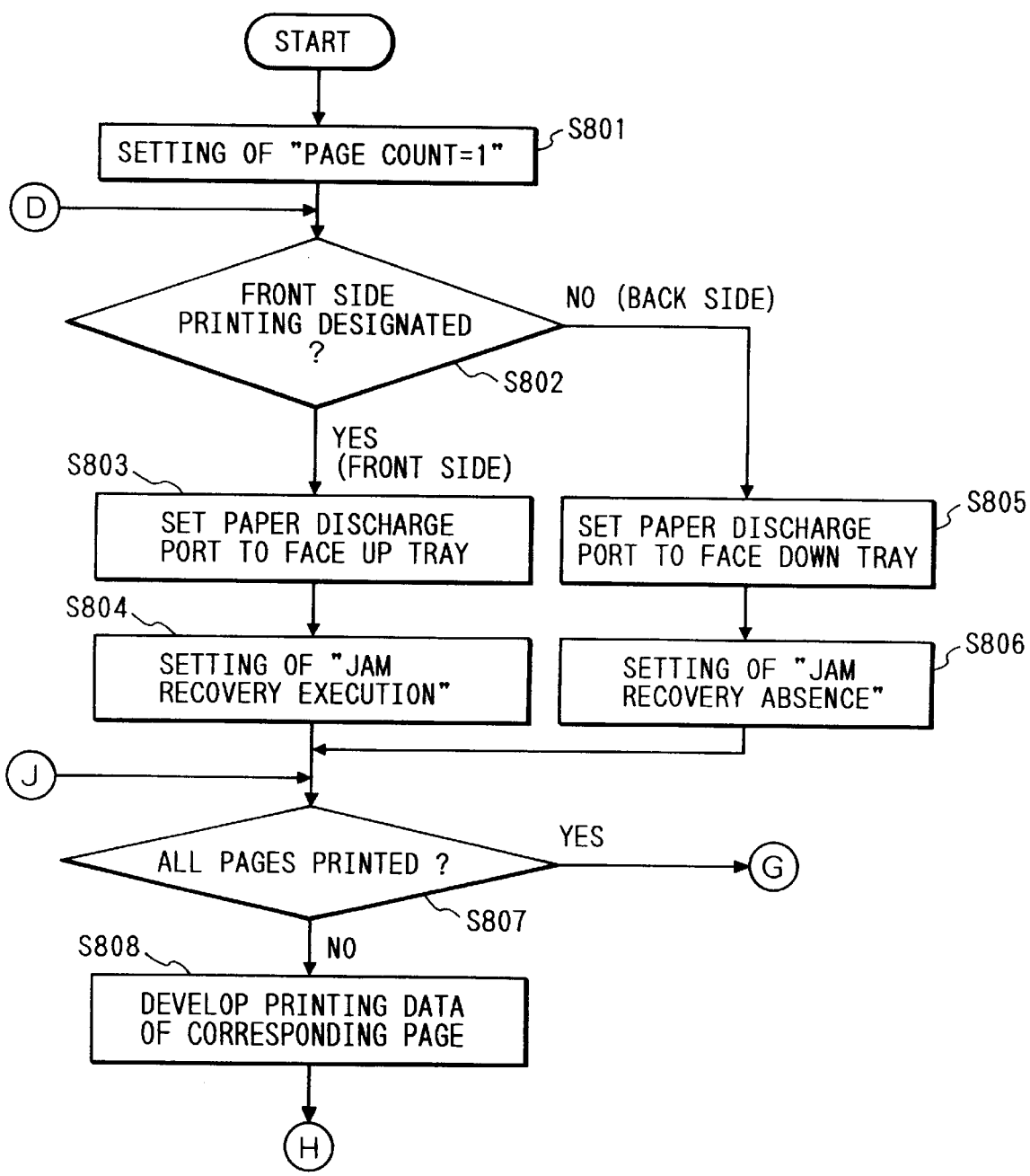

FIG. 19

RECOVERY

FIG. 20

PLEASE SET
DISCHARGED
PAPERS TO PAPER
FEEDING PORT

RECOVERY FINISHED.
PLEASE COMPLETE
PAGES.

PRINT CONTROL APPARATUS AND METHOD FOR EXECUTING A JAM RECOVERY FUNCTION WHEN A JAM IS DETECTED DURING PRINTING ON A FRONT SIDE OF A RECORDING MEDIUM

BACKGROUND OF THE INVENTION

1. Field of the Invention

The present invention relates a printing apparatus having a printing mechanism which is constructed in a manner such that printing data to be printed to a front side is first printed onto a recording medium with respect to all pages and, after that, printing data to be printed to a back side is printed onto the back side of the recording medium whose front side was printed with respect to all of the pages, thereby allowing both-sided printing to be performed.

2. Related Background Art

There is a printing apparatus having a printing mechanism which is constructed in a manner such that printing data to be printed to a front side is printed onto a recording medium with respect to all pages and, after that, printing data to be printed to a back side is printed onto the recording medium whose front side was printed with respect to all of the pages, thereby allowing a both-sided printing to be performed. Such a printing method has the following problems.

(1) Generally, when a paper jam (jam) occurs during the printing process, a printing apparatus itself performs a jam recovery process. However, in a printing apparatus having only a one-side printing mechanism, when a both-sided printing is performed, it is desirable to perform the jam recovery in front-side (odd page) printing. When the jam recovery is automatically performed at the time of back-side (even page) printing, however, all of the subsequent pages (sheets) cause a page deviation, so that a number of erroneous printing results are caused.

(2) When a paper discharge destination is properly selected at the time of the front-side (odd page) printing, a troublesome operation such that the operator exchanges sheets to be printed and outputted for the back-side (even page) printing occurs.

(3) In a host computer, further, in order to perform both-sided printing, data for the front-side (odd page) printing and data for the back-side (even page) printing have to be individually formed.

SUMMARY OF THE INVENTION

According to the invention, in consideration of problems such as the troublesomeness to the operator for a both-sided print process in a printing apparatus and the occurrence of an erroneous printing, the following methods and apparatuses are provided, namely:

(1) by designating a printing side (front or back) from a host computer or an operation panel, whether a jam recovery is executed or not can be automatically set;

(2) by designating the printing side (front or back) from the host computer or operation panel, an optimum paper discharge port can be automatically selected;

(3) in the case where the same printing data is transmitted twice from the host computer in accordance with a designation from the host computer or operation panel, when the front-side printing (odd page printing) is designated, even page (back side) data is automatically skipped and, when the back-side printing (even page printing) is designated, odd page (front side) data is automatically skipped; and (4) in the case of using a two-way interface at the time of the back-side printing (even page printing), and further, by returning a jammed page number (sheet number) to the host computer; a troublesomeness to the operator is eliminated and a correct printing result can be always obtained;

(5) further, by receiving again the printing data of the jammed page and printing it, the printing data of all pages is not stored in a memory for the jam recovery, a capacity of a memory of the printing apparatus can be minimized and the jammed page can be printed again;

(6) moreover, on the host computer side, in the case where the apparatus is set to a mode such that the odd page (front side) is transmitted and, after that, the even page (back side) is transmitted, when data indicative of the occurrence of a jam and data indicative of the jammed page are received from the printing apparatus, the printing data of the jammed page is transmitted in a manner such that after all of the printing data of the odd pages (front side) was transmitted, by transmitting all of the printing data of the even pages (back side), the printing apparatus for receiving the printing data can print all of the printing data of the odd pages (front side) and, after that, can print all of the printing data of the even pages (back side).

It is an object of the invention to provide a print control apparatus for printing data of a plurality of pages onto both sides of a recording medium, comprising:

a first side print control unit for controlling in a manner such that printing data of one of an even page and an odd page is printed onto a first side of the recording medium by a print unit for printing the printing data onto the recording medium;

a second side print control unit for controlling in a manner such that printing data of another one of the even page and the odd page is printed onto a second side of the recording medium in which the printing data of one of the even page and the odd page has been recorded on the first side by the print unit;

a detection unit for detecting print trouble in the print unit; and a non-trouble recovery control unit for controlling the apparatus in a manner such that in the case where the print trouble is detected by the detection unit during the print control by the second side print control unit, the trouble is released and, after that, the printing data of a page in which the trouble occurred is not printed but printing data of remaining pages is printed onto the recording medium.

Another object of the invention is to provide a print control apparatus for printing data of a plurality of pages onto both sides of a recording medium, comprising:

a first side print control unit for controlling in a manner such that printing data of one of an even page and an odd page is printed to a first side of a recording medium by a print unit for printing printing data onto the recording medium;

a first side discharge control unit for controlling the apparatus in a manner such that, in case of printing the printing data of one of the even page and the odd page is printed onto the first side of the recording medium by the print unit by being controlled by the first side print control unit, the recording medium on which the printing data of one of the even page and the odd page has been recorded is discharged so as to face up the first side of the recording medium;

a second side print control unit for controlling the apparatus in a manner such that printing data of another one of the even page and the odd page is printed onto a second side of the recording medium in which the printing data of one of the even page and the odd page has been recorded on the first side by the print unit; and a second side discharge control unit for controlling the apparatus in a manner such that, in case of printing the printing data of another one of the even page and the odd page is printed onto a second side of the recording medium by the print unit by being controlled by the second side print control unit, the recording medium on which the printing data of another one of the even page and the odd page has been recorded is discharged so as to face down the second side of the recording medium.

Still another object of the invention is to provide a print control method for printing printing data of a plurality of pages onto both sides of a recording medium, comprising the steps of:

controlling printing in a manner such that printing data of one of an even page and an odd page is printed onto a first side of a recording medium by a print unit for printing printing data onto the recording medium;

controlling printing in a manner such that printing data of another one of the even page and the odd page is printed onto a second side of the recording medium in which the printing data of one of the even page and the odd page has been recorded on the first side by the print unit;

detecting a print trouble in the print unit; and controlling printing in a manner such that in the case where the printing trouble is detected during the print of the printing data of another one of the even page and the odd page by an instruction of the second side printing, the printing data of a page in which the trouble occurred is not printed but printing data of remaining pages is printed onto the recording medium.

Further, another object of the invention is to provide a print control method for printing printing data of a plurality of pages onto both sides of a recording medium, comprising the steps of:

controlling printing in a manner such that printing data of one of an even page and an odd page is printed onto a first side of a recording medium by a print unit for printing printing data onto the recording medium;

controlling printing in a manner such that, in the case where the printing data of one of the even page and the odd page is printed onto the first side of the recording medium by the print unit, the recording medium on which the printing data of one of the even page and the odd page has been recorded is discharged so as to face up the first side of the recording medium;

controlling printing in a manner such that the printing data of another one of the even page and the odd page is printed onto a second side of the recording medium in which the printing data of one of the even page and the odd page has been recorded on the first side by the print unit; and controlling printing in a manner such that, in the case where the printing data of another one of the even page and the odd page has been printed on the second side of the recording medium by the print unit, the recording medium on which the printing data of another one of the even page and the odd page has been recorded is discharged so as to face down the second side of the recording medium.

Further another object of the invention is to provide a memory medium in that a program which can be read by a computer has been stored, wherein the program comprises the steps of:

controlling printing in a manner such that printing data of one of an even page and an odd page is printed onto a first side of the recording medium by a print unit for printing printing data onto the recording medium;

controlling printing in a manner such that printing data of another one of the even page and the odd page is printed onto a second side of the recording medium in which the printing data of one of the even page and the odd page has been recorded on the first side by the print unit;

detecting a print trouble in the print unit; and controlling printing in a manner such that, in the case where the printing trouble is detected during the print of the printing data of another one of the even page and the odd page by an instruction of the second side printing, printing data in which the trouble occurred is not printed but printing data of remaining pages is printed onto the recording medium.

Further another object of the invention is to provide a memory medium in that a program which can be read by a computer has been stored, wherein the program comprises the steps of:

controlling printing in a manner such that printing data of one of an even page and an odd page is printed onto a first side of the recording medium by a print unit for printing printing data onto the recording medium;

controlling printing in a manner such that, in the case where the printing data of one of the even page and the odd page was printed on the first side of the recording medium by the print unit, the recording medium on which the printing data of one of the even page and the odd page has been recorded is discharged so as to face up the first side of the recording medium;

controlling printing in a manner such that the printing data of another one of the even page and the odd page is printed onto a second side of the recording medium in which the printing data of one of the even page and the odd page has been recorded on the first side by the print unit; and controlling printing in a manner such that, in the case where the printing data of another one of the even page and the odd page was printed on the second side of the recording medium by the print unit, the recording medium on which the printing data of another one of the even page and the odd page has been printed is discharged so as to face down the second side of the recording medium.

Further another object of the invention is to provide a memory medium in that a program which can be read by a computer has been recorded, wherein the program comprises the steps of:

getting data indicative of a jammed page; and printing printing data of one of an even page and an odd page and, after that, transmitting printing data so as to print printing data of another one of the even page and the odd page on the basis of the jammed page indicated in the data got by the getting step.

BRIEF DESCRIPTION OF THE DRAWINGS

FIG. 11 is a flowchart showing a processing method in case of performing a both-side printing by transmitting same printing data twice from a host computer in an embodiment 2;

FIG. 13 is a flowchart showing a printing process in association with the selection of an optimum paper discharge port and a setting of the presence or absence of a jam recovery from a host computer after completion of the printing of all pages in the case where a jam occurs in the back-side printing mode and a jammed page is returned from the host computer according to an embodiment 3;

FIG. 19 shows a display picture plane of a CRT in the case where after the print process was finished, the host computer again transmits the jammed page in the embodiment 3;

FIG. 20 shows a display picture plane after completion of the printing of the front side when the jammed page is printed after the end of the printing process in the embodiment 3;

DETAILED DESCRIPTION OF THE PREFERRED EMBODIMENTS

Embodiment 1

Figure 1:
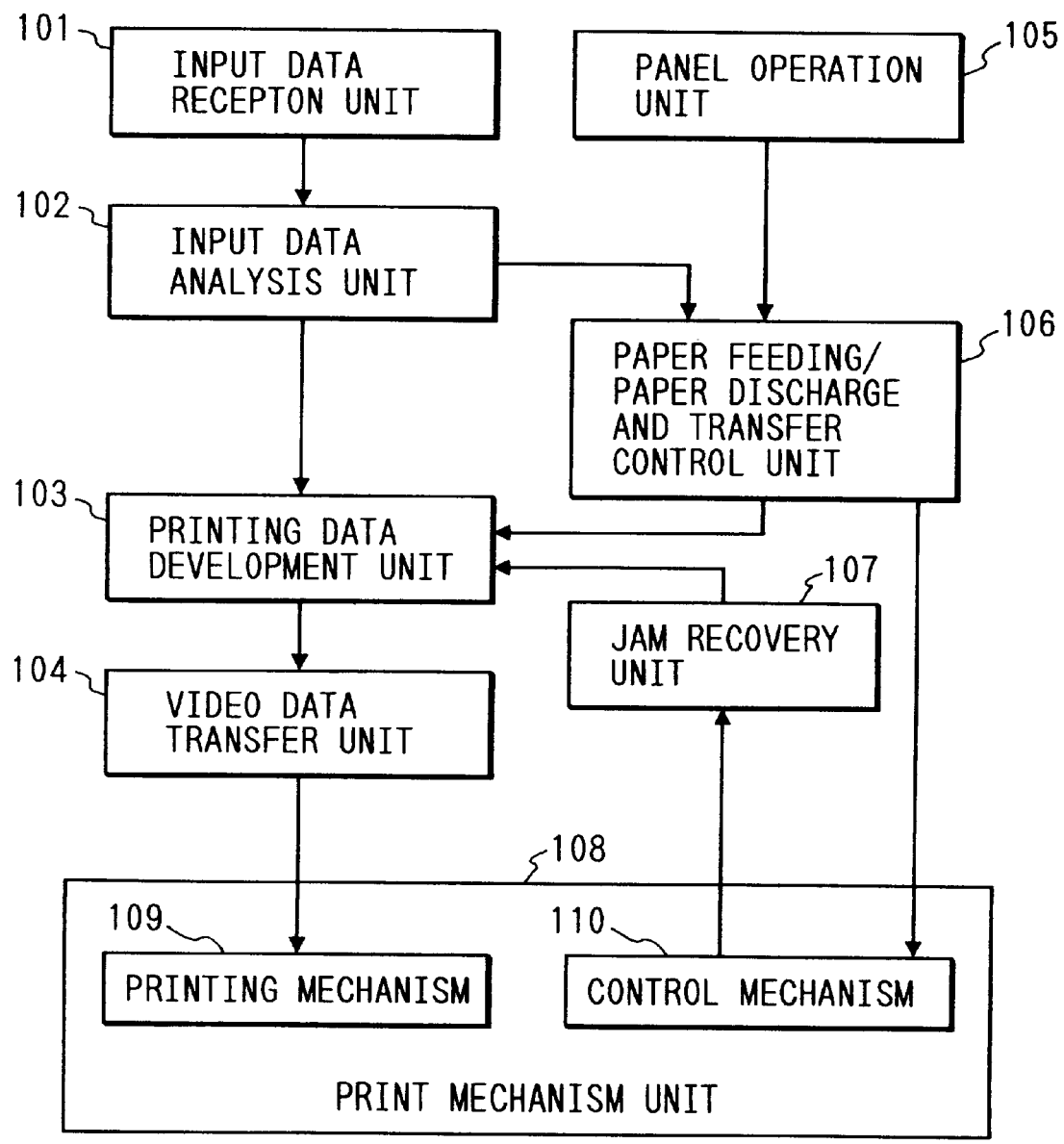
FIG. 1 is a block diagram showing a schematic functional construction of a printing apparatus in the invention.

An embodiment of the invention will now be described hereinbelow with reference to the drawings. FIG. 1 is a schematic block diagram showing a functional construction of a printing apparatus in the invention. In FIG. 1, reference numeral 101 denotes an input data reception unit for receiving input data transmitted from a host computer. The input data is constructed by: data such as character code, figure, image, and the like and data for printing to designate a printing position, a size, and the like, in which the data and the data for printing are used to actually perform a print process; and control data for a print mechanism unit (printer engine). The control data is, for example, control data for designating a switching control such as paper feeding mode (cassette paper feeding or manual paper feeding), paper discharging mode (face up or face down), and the like.

Reference numeral 102 denotes an input data analysis unit for analyzing the input data received by the input data reception unit 101 and dividing it to the printing data and the control data; 103, a unit for developing the printing data divided by the input analysis unit 102 to bit map information of one page as output data; and 104, a video data transfer unit for transferring the bit map information of one page developed by the printing data development unit 103 to a printing mechanism of a print mechanism unit.

Reference numeral 105 denotes a panel operation unit for displaying a state of the printing apparatus and for setting a printing environment for the printing apparatus by the operator; reference numeral 106 indicates a paper feeding/paper discharge and transfer control unit for controlling the printing data development unit 103, video data transfer unit 104, and an engine control mechanism of the print mechanism unit (printer engine) on the basis of the control data divided by the input data analysis unit 102 and the print environment designated by the panel operation unit 105.

Reference numeral 107 indicates a jam recovery unit for automatically performing a re-printing process of a jammed paper after the operator eliminated a jammed paper in the case where a jam had occurred in a paper carrier system in the print mechanism unit (printer engine). The units 101 to 107 realize functions in a controller of the printing apparatus. Reference numeral 108 denotes an actual print mechanism unit (printer engine); 109, a printing mechanism for performing an electrophotography process in the print mechanism unit; and 110 a control mechanism for controlling a paper feeding/carrier system (paper feeding mode or paper discharge process) or the like in the print mechanism unit.

Figure 2:
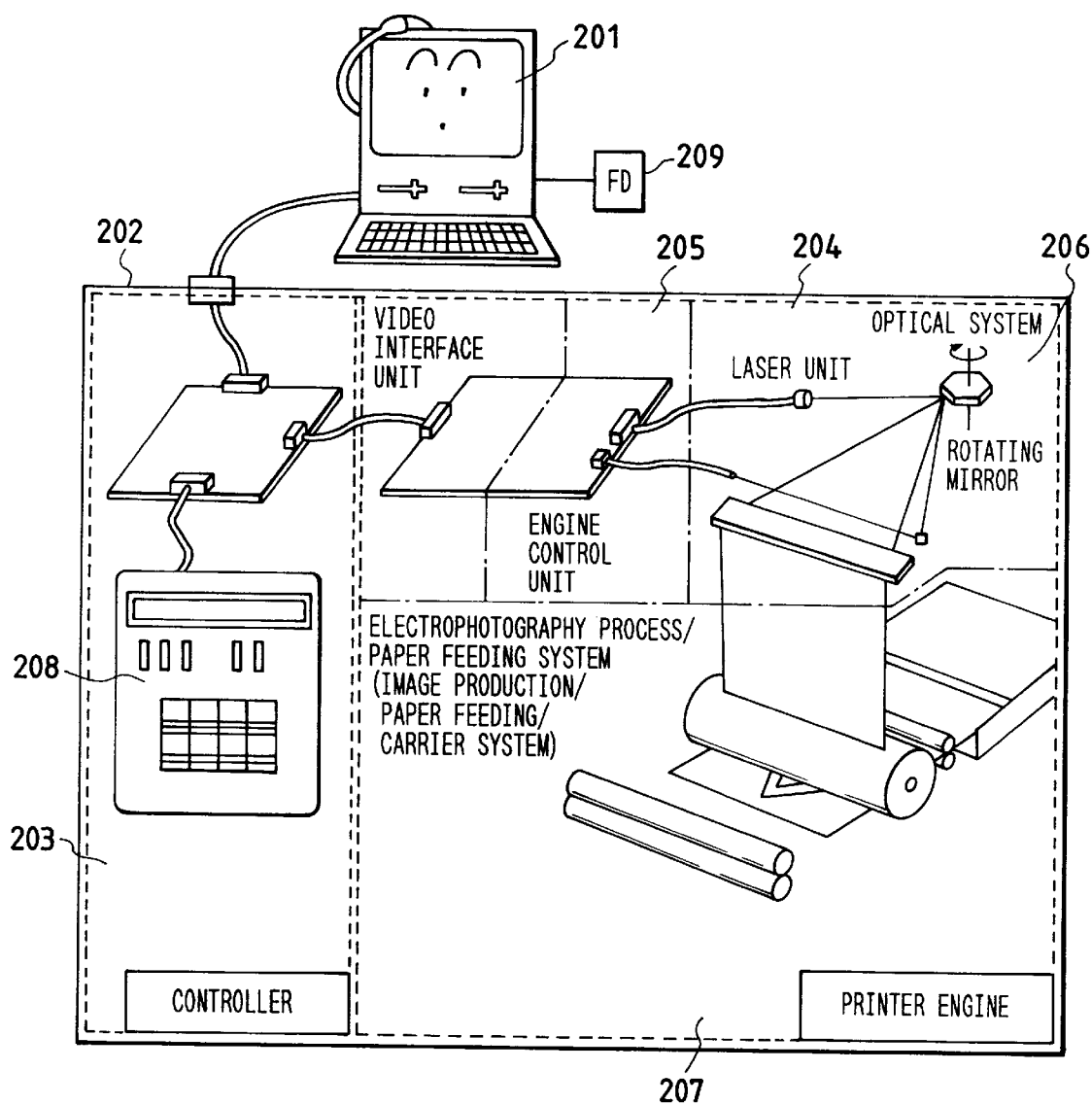
FIG. 2 is a diagram showing an example of a printer which can be applied in the embodiment.
Figure 3:
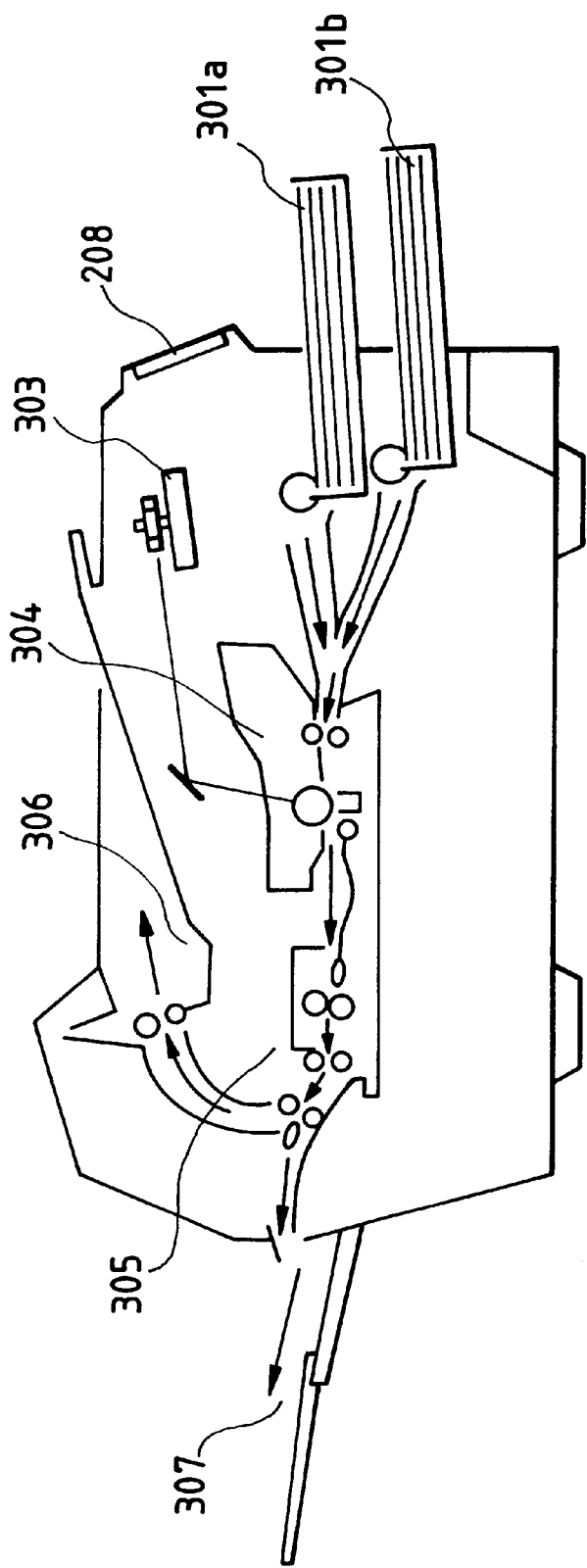
FIG. 3 is a conceptual diagram showing a paper feeding/carrier system shown in FIG. 2.

FIGS. 2 and 3 show general constructions in the printing apparatus. In FIG. 2, reference numeral 201 denotes a host computer for transmitting various data to the printing apparatus; 202 is an example of the printing apparatus in the present invention (in this instance, a laser beam printer using a laser beam as a light emitting device is shown); 203, a controller unit of the printing apparatus corresponding to the construction shown by the units 101 to 107 in FIG. 1; 204, a print mechanism unit (printer engine) of the printing apparatus corresponding to the print mechanism unit 108 in FIG. 1; and 208, an operation panel in the printing apparatus corresponding to the panel operation unit 105 in FIG. 1.

Reference numeral 205 indicates a control unit for controlling the whole unit in the print mechanism unit 204. The control unit 205 corresponds to the control mechanism 110 in FIG. 1. The control unit 205 is constructed by: a video interface unit for receiving a video signal from the controller unit 203 and for transmitting a status of an engine to the controller unit; and an engine unit for controlling an electrophotography process/paper feeding/carrier system and an optical system. Reference numeral 206 denotes the optical system in the print mechanism unit 204 corresponding to the printing mechanism 109 in FIG. 1; 207, the electrophotography process/paper feeding/carrier system in the print mechanism unit 204; and 209 a disk in which a program that is supplied to the host computer has been stored.

FIG. 3 is a diagram showing a cross section of the printing apparatus. In this instance, in FIG. 3, reference numerals 301a and 301b denote paper feeding cassettes.

Reference numeral 303 indicates a rotating mirror for irradiating a laser beam onto a photosensitive drum; 304 indicates a photosensitive drum; 305, a fixing device; 306, a face-down paper discharge tray; and 307, a face-up paper discharge tray. An arrow in the diagram indicates a carrying direction of a paper in the paper feeding/carrier system.

Figure 4:
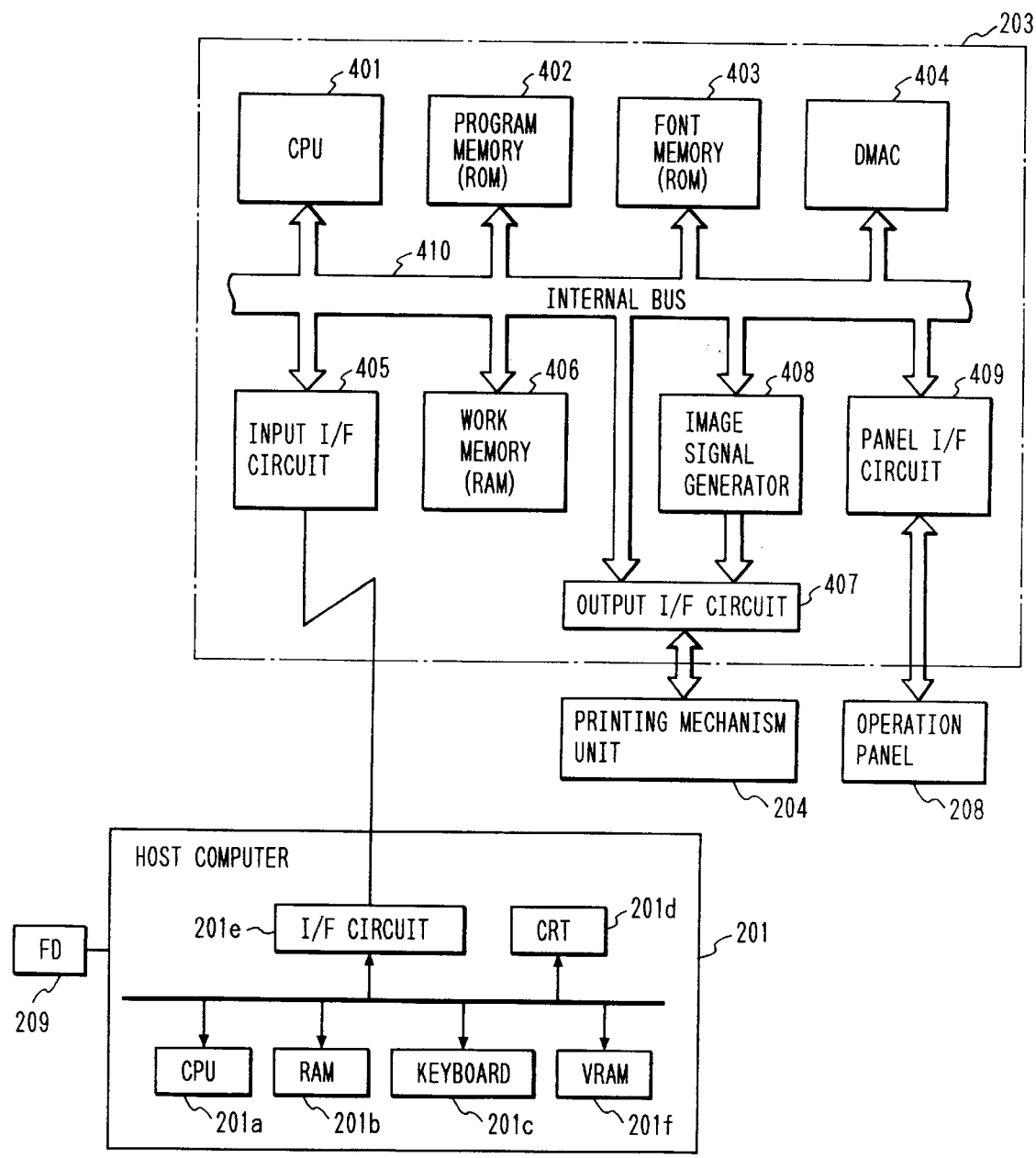
FIG. 4 is a block diagram of a controller unit shown in FIG. 2.

FIG. 4 is a block diagram of the controller unit 203 and host computer 201 shown in FIG. 2. In FIG. 4, reference numeral 401 denotes a central processing unit (CPU) for controlling the whole controller unit; 402, a program memory in which a program for controlling the controller unit has been stored and which is constructed by, for example, ROM (read only memory); 403, a font memory in which information of fonts, each for developing a character code to a bit map, has been stored and which is constructed by, for example, ROM (read only memory); and 404, a hardware circuit for transferring a bit map image obtained by developing the printing data to the print mechanism unit and which is constructed by, for example, a DMAC (direct memory access controller) or an FIFO.

Reference numeral 405 denotes a data input interface (I/F) circuit for connecting the host computer 201 and the controller unit 203; 406, a work memory which is necessary for the program in the memory 402 to operate and which is constructed by, for example, RAM (random access memory). A storage area of input data, a printing data development area, and the like are also allocated to the work memory 406. Printing data which is printed in the invention is previously sent from the host computer 201 to the work memory 406 and is stored therein. Reference numeral 407 denotes a data output interface (I/F) circuit for connecting the controller unit 203 and the print mechanism unit 204; 408, an image signal generator for generating the video signal from the bit map developed in the printing data development area in the work memory 406 synchronously with the print mechanism unit 204; 409, a panel interface circuit for connecting the operation panel 208 and controller unit 203; and 410, an internal bus for connecting the memories, circuits, and CPU.

Reference numeral 201a denotes a central processing unit (CPU) for controlling the whole host computer 201; 201b denotes RAM (random access memory) functioning as a work memory necessary for the program to operate or an area for storing a program which is supplied from the FD 209; 201c, a keyboard as an apparatus which is used when the user inputs data or commands to the host computer 201; 201d, a CRT for displaying on a picture plane; 201e, an interface circuit for connecting the host computer 201 and controller unit 203; and 201f, a VRAM as a memory for writing the data or commands into the memory in order to display them by the CRT 201d.

Embodiment 2

Figure 5:
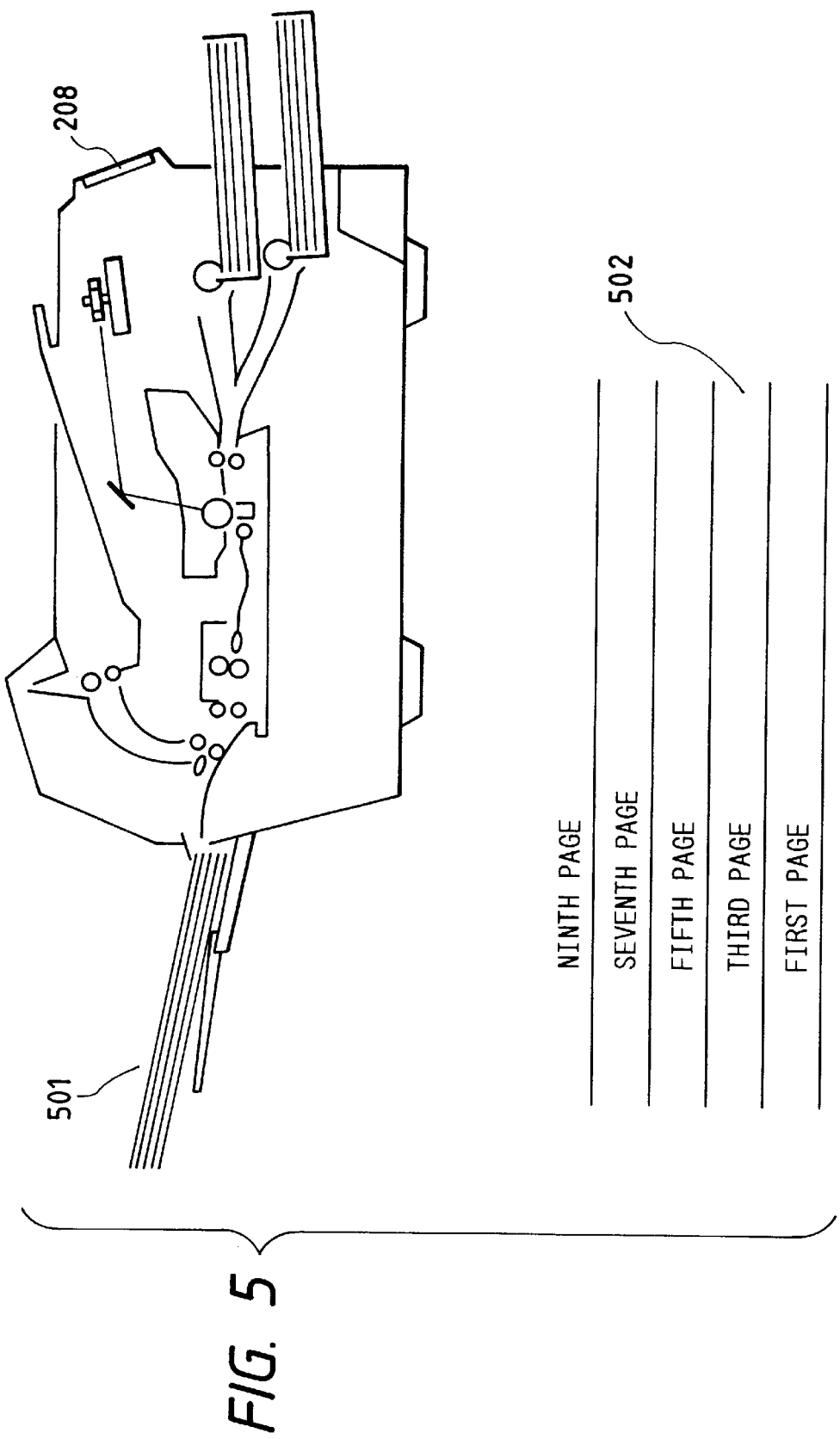
FIG. 5 is a diagram showing a procedure of a both-sided print process in the invention.

The operation of the invention will now be schematically explained with reference to FIGS. 5 to 7. In FIG. 5, when the user selects the front-side printing from the host computer 201 or operation panel 208, the CPU 401 receives a command from the host computer 201 or operation panel 208, outputs an instruction to print an odd page onto the front side and to discharge the paper in a face-up state. Consequently, as shown at reference numeral 502, printing data of the 1st, 3rd, 5th, 7th, and 9th pages is sequentially printed to the front sides of the papers, respectively and the printed papers are discharged to the positions in a face-up paper discharge tray 501.

Figure 6:
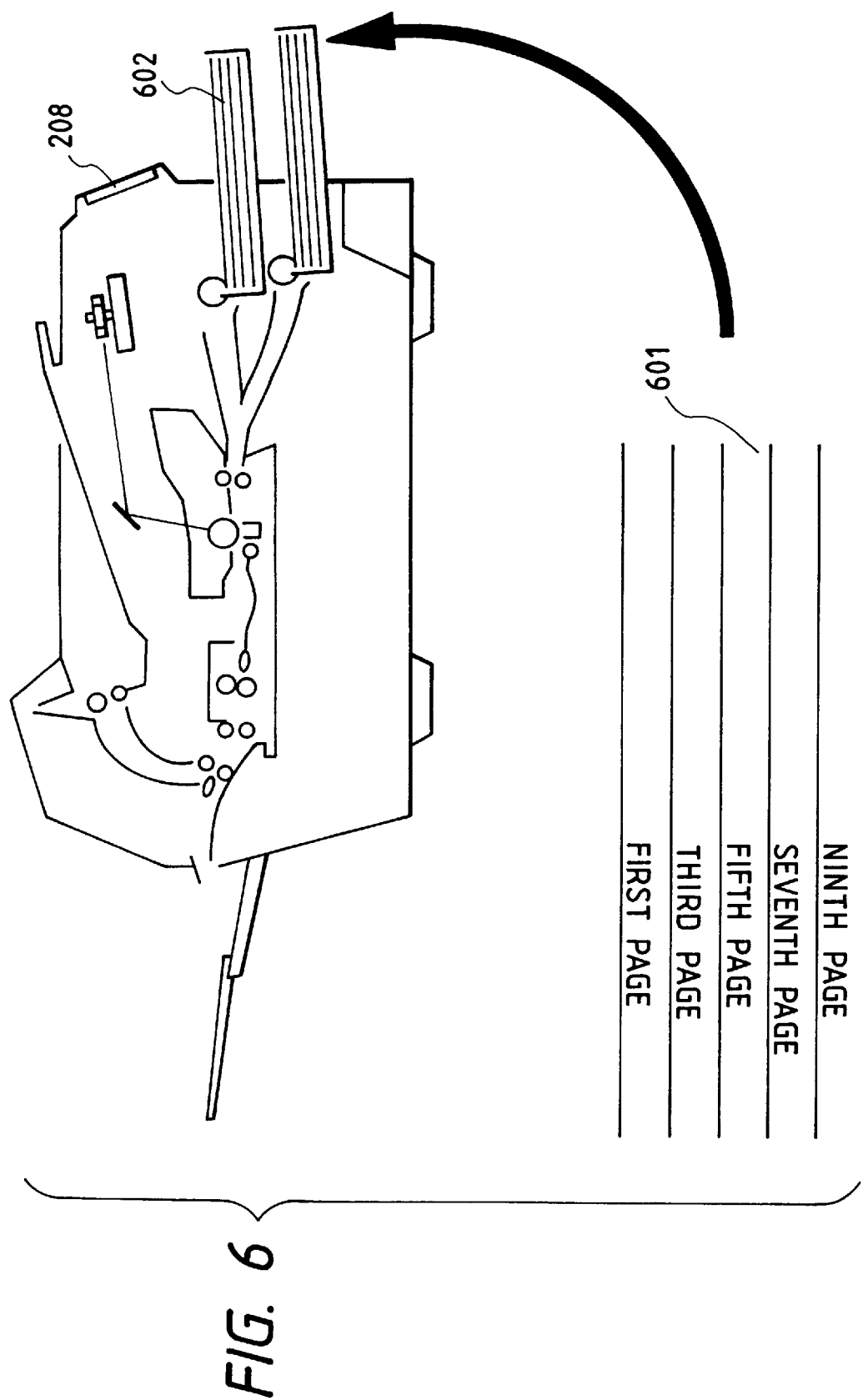
FIG. 6 is a diagram showing a procedure of the both-sided print process in the invention.
Figure 7:
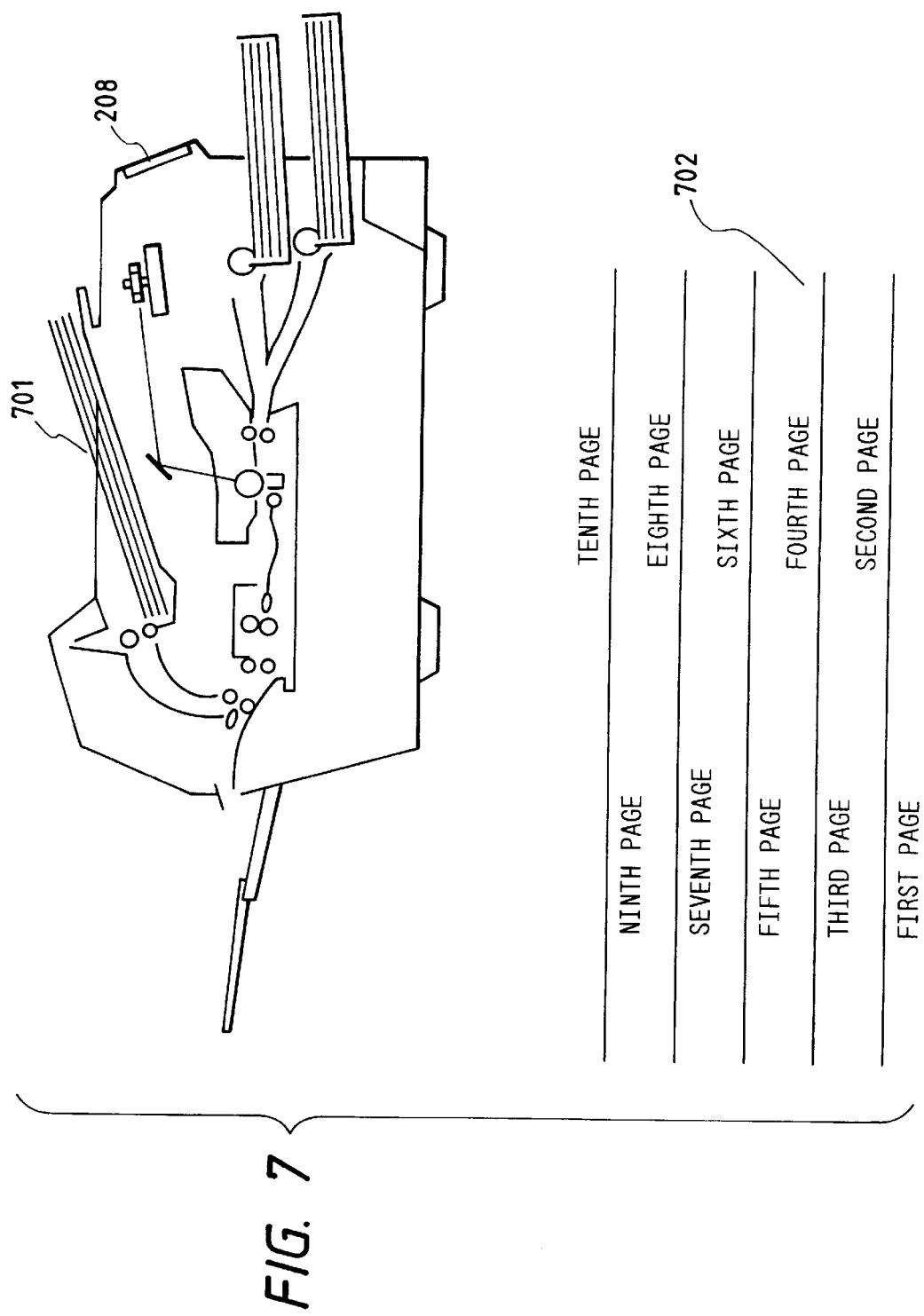
FIG. 7 is a diagram showing a procedure of the both-sided print process in the invention.

In the case of performing the back-side printing, the user reverses the papers on which the odd pages have been printed on the front sides as shown at reference numeral 502 in FIG. 5 and sets the papers to a paper feeding cassette 602 in FIG. 6. In this instance, when the user selects the back-side printing from the operation panel 208, the CPU 401 receives a command from the host computer 201 or operation panel 208, and outputs an instruction to print the even page onto the back side and to discharge the paper in a face-down state. The printing data of the 2nd, 4th, 6th, 8th, and 10th pages is sequentially printed onto the back sides of the papers as shown at reference numeral 702 and the printed papers are sequentially discharged to positions in a face-down discharge tray 701.

Detailed processes of the invention will now be described with reference to flowcharts of FIGS. 8 to 10.

According to the invention, an instruction command of the front-side or back-side printing is received from the operation panel 208 or host computer 201 by the CPU 401, thereby allowing the apparatus to be activated. The same shall also similarly apply to FIGS. 13 to 15.

In this instance, a case where all of the printing data of the odd pages (front side) is outputted and, after that, the printing data of the even pages (back side) is outputted in order to perform the both-side printing will now be explained. A specific setting will be described in detail in the explanation of FIG. 18.

Figure 8:
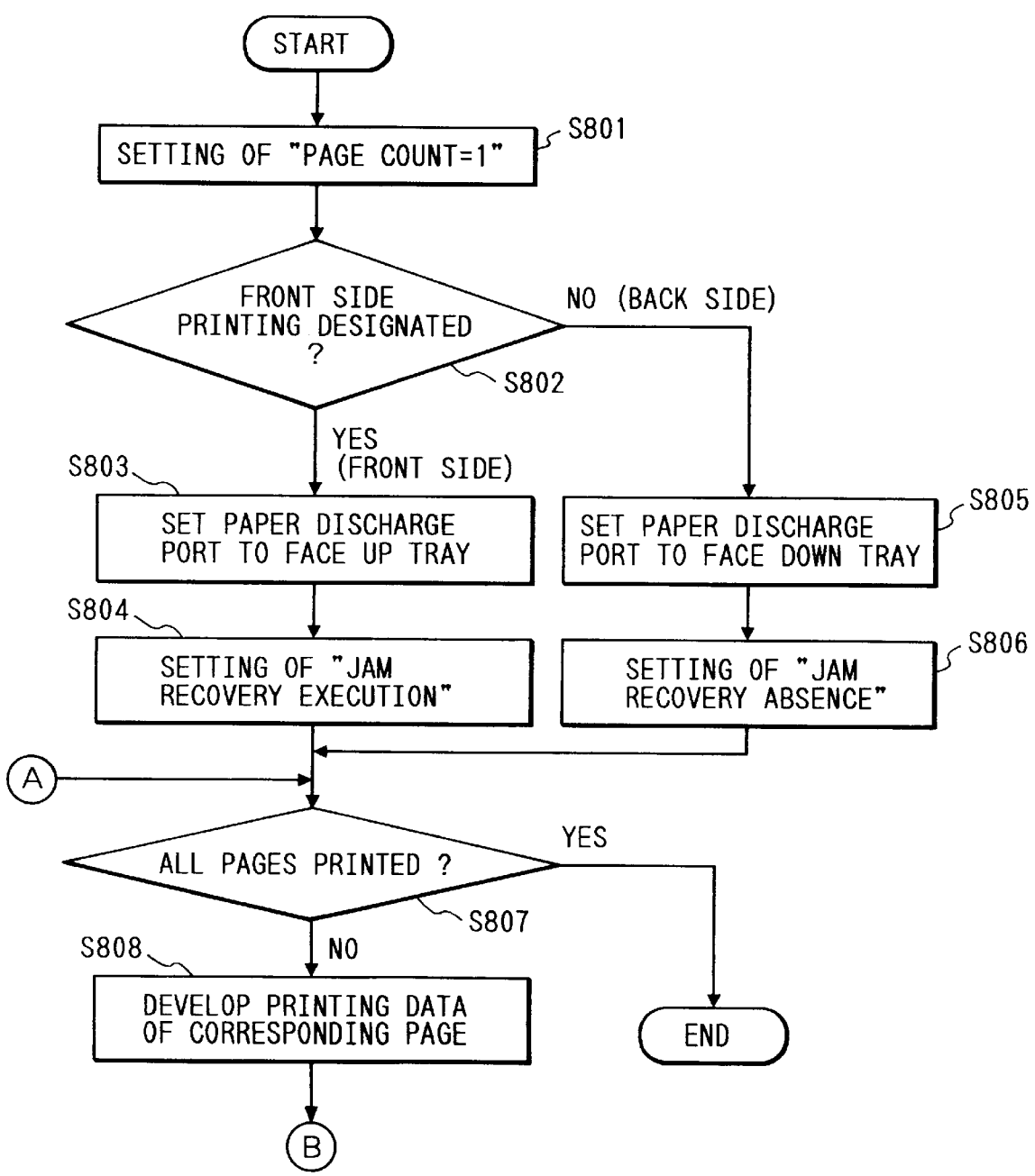
FIG. 8 is a flowchart for showing a printing process in association with a selection of an optimum paper discharge port and a setting of the presence or absence of a jam recovery in an embodiment 1.

First, a page count is set to "1" (step S801 in FIG. 8).

Subsequently, the CPU 401 judges whether the printing mode is the front-side printing or the back-side printing by a command received from the host computer 201 or operation panel 208 (step S802 in FIG. 8).

When the front side printing is judged, the apparatus is set into a mode in which the paper whose front side was printed is discharged to the face-up paper discharge tray 502 (step S803 in FIG. 8). The CPU 401 stores a command for executing the jam recovery into the work memory 406 (step S804 in FIG. 8).

When the back-side printing is judged, a paper discharge port is set to the face-down paper discharge tray 701 (step S805 in FIG. 8). The CPU 401 stores a command which inhibits the jam recovery process defined in FIG. 10 into the work memory (step S806 in FIG. 8).

In this instance, in accordance with the printing data transmitted from the host computer 201, a check is made to see if all of the pages have been printed and outputted. If YES, the processing routine is finished. If there is the printing data which is not outputted, the processing routine advances to the next step (step S807 in FIG. 8).

The printing data of the page stored in the work memory 406 is developed to an image in another area in the work memory 406 (step S808 in FIG. 8).

Subsequently, the image is transferred onto the paper by transferring the developed data to the printer engine and the printed paper is discharged to the paper discharge port designated in step S803 or S805 in FIG. 8 (step S901 in FIG. 9). A check is made to see whether a jam has occurred during the paper carrying operation (step S902 in FIG. 9). If NO, the page count is increased by "+1" (step S907 in FIG. 9) and the processing routine is returned to step S807 in FIG. 8.

Figure 9:
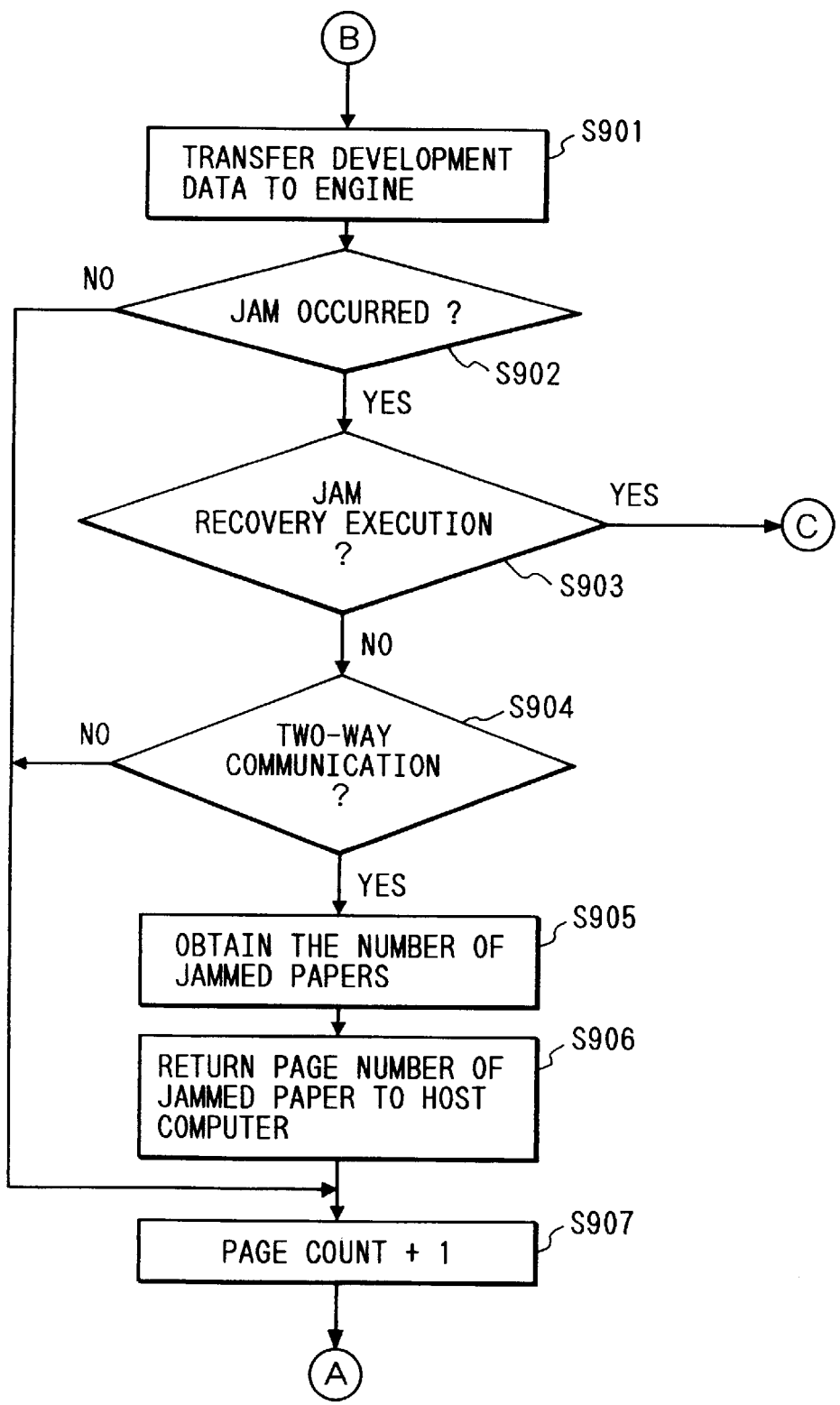
FIG. 9 is a continuation of the flowchart in FIG. 8.
Figure 10:
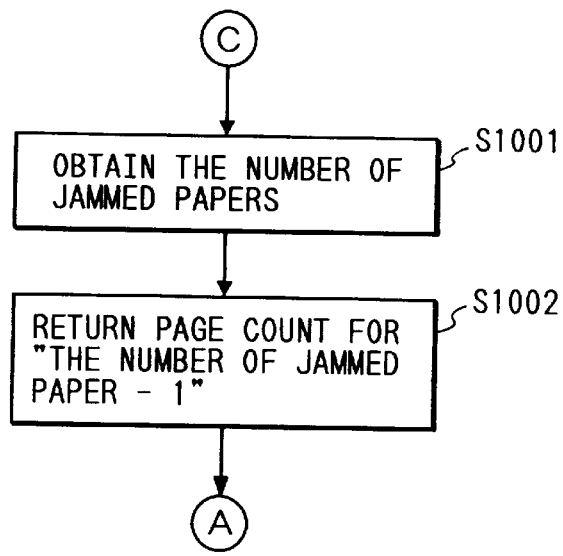
FIG. 10 is a continuation of the flowchart in FIG. 9.

When a jam occurs, the CPU 401 calls a command from the work memory 406 and judges whether a mode to execute the jam recovery has been set or not (S903 in FIG. 9). In the case where the mode to execute the jam recovery is set (front-side printing), the number of jammed papers in the paper feeding/carrier system of the printer engine is actually obtained from the printer engine (step S1001 in FIG. 10). The page count is returned by the number (the number of jammed papers −1) (step S1002 in FIG. 10). The processing routine is returned to step S807 in FIG. 8.

In step S903 in FIG. 9, in the case where a mode not to execute the jam recovery is set (back-side printing), a check is made to see if the communication with the host computer 201 is a two-way communication (step S904 in FIG. 9). If NO, the page count is increased by "+1" (step S907). The processing routine is returned to step S807 in FIG. 8.

In case of the two-way communication, the number of jammed papers in the paper feeding/carrier system of the printer engine is actually obtained from the printer engine (step S905 in FIG. 9). The last page number of the jammed paper is returned to the host computer 201 as a value of the page count (step S906 in FIG. 9). The page count is increased by "+1" (step S907 in FIG. 9). The processing routine is returned to step S807 in FIG. 8.

According to the embodiment, the processes when the work memory 406 receives all of the printing data from the host computer 201 have been shown. However, it is also possible to receive the printing data of either one of the odd pages and the even pages from the host computer 201 and to process the same.

Figure 12:
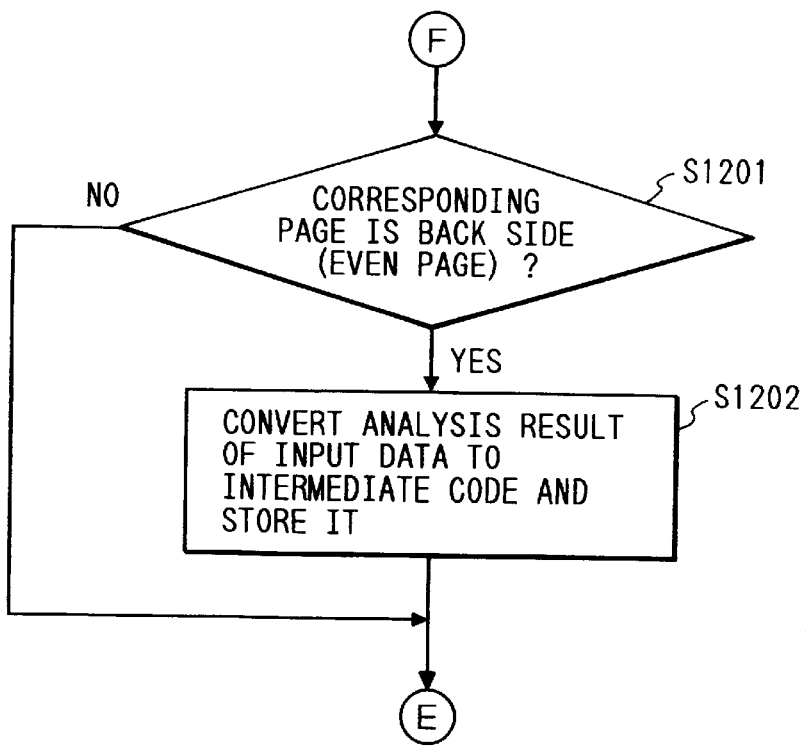
FIG. 12 is a flowchart showing the processing method in a case of performing both-sided printing by transmitting the same printing data twice from the host computer in the embodiment 2.

Flowcharts of FIGS. 11 and 12 show processes in the case where by transmitting the same printing data twice from the host computer 201 in accordance with an instruction from the host computer 201 or operation panel 208, the both-sided printing is executed by the one-side printing apparatus. The flowcharts show the processes of the printing data of one page from the host computer 201. In a series of documents, it is sufficient to execute the above processes for every page. In the embodiment 1, all of the printing data has previously been stored in the work memory 406. In this case, however, the work memory 406 first stores the printing data of the odd pages or even pages in the processes in a state in which no printing data is stored.

First, the apparatus waits for an input of the printing data from the host computer 201 (step S1101 in FIG. 11). A check is subsequently made to see if the process of the printing data of one whole page has been performed (step S1102 in FIG. 11). If YES, the processing routine is finished. If NO, an analysis process of the input data is executed (step S1103 in FIG. 11). At this time, since registration items such as a download font and the like and various control codes other than the printing data (character code, figure, image, etc.) are included in the input data, it is necessary to execute the analysis process irrespective of the front or back side.

A check is made to see if the front-side printing has been designated (step S1104 in FIG. 11). In case of the front-side printing, a check is made to see if the page is the odd page (front side) (step S1105 in FIG. 11). If NO (in case of the even page), the processing routine is returned to step S1101 in FIG. 11. In case of the odd page (front side), the analysis result of the printing data is converted into an intermediate code and stored into the work memory 406 (step S1106 in FIG. 11). The processing routine is returned to step S1101 in FIG. 11.

Generally, the printing data inputted from the host computer is subjected to the analysis process and is converted into an intermediate code that is peculiar to the printing apparatus and is stored. After that, when the intermediate codes of one page are stored, bit map data of one page is developed on the basis of the intermediate codes.

When the back-side printing is designated in step S1104 in FIG. 11, a check is made to see if the relevant page is the even page (back side) (step S1201 in FIG. 12). If NO (in case of the odd page), the processing routine is returned to step S1101 in FIG. 11. In case of the even page (back side), the analysis result of the printing data is converted into the intermediate code and stored into the work memory 406 (step S1202 in FIG. 12). The processing routine is returned to step S1101 in FIG. 11. After completion of the processes, the processing routine advances to step S801 in the embodiment 1 and the printing process of the odd or even page and the process in case of a jam are actually executed.

Embodiment 3

Figure 14:
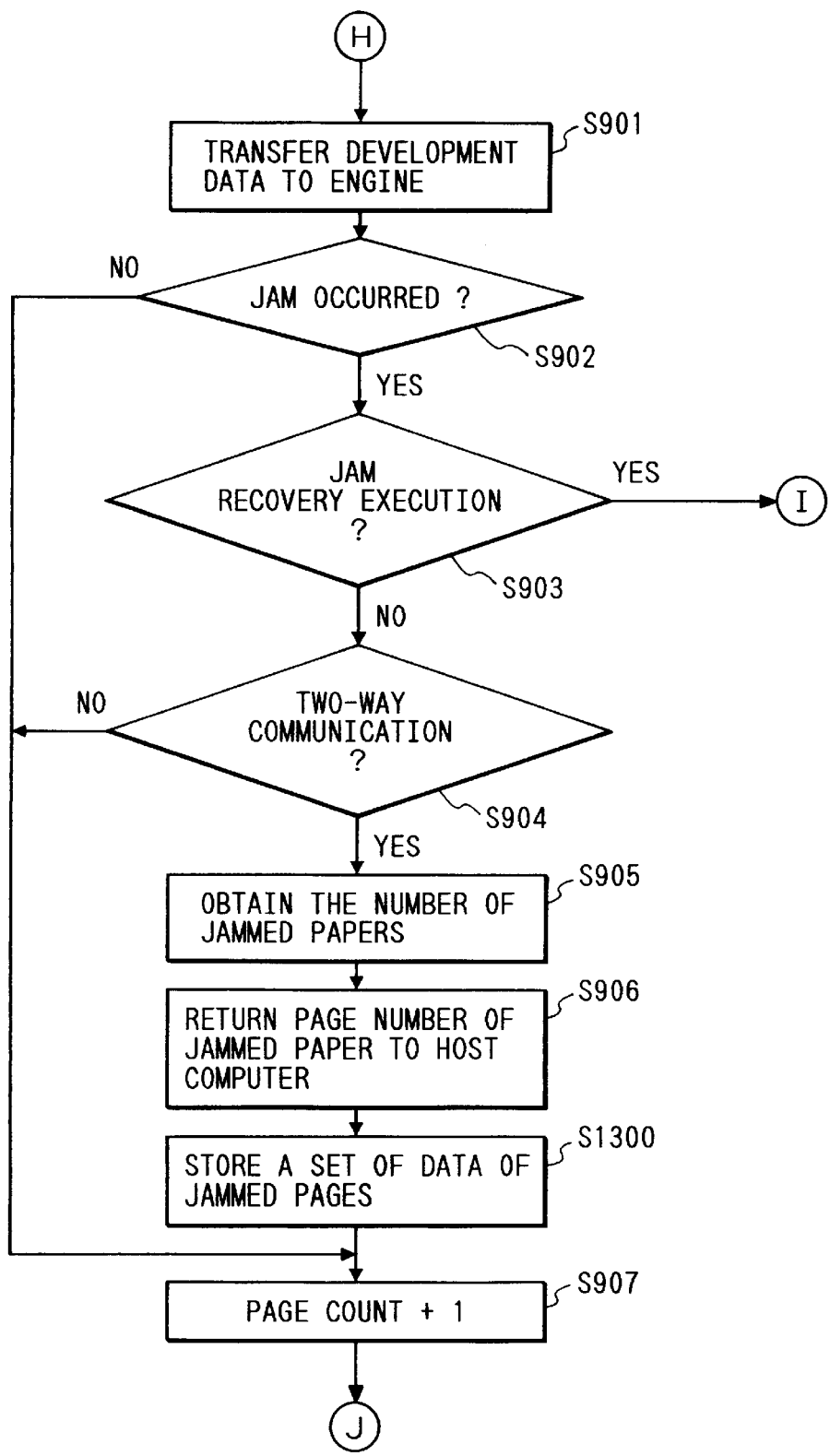
FIG. 14 is a flowchart showing the printing process in association with the selection of the optimum paper discharge port and the setting of the presence or absence of the jam recovery from the host computer after completion of the printing of all pages in the case where a jam occurs in the back-side printing mode and the jammed page is returned from the host computer according to the embodiment 3.
Figure 15:
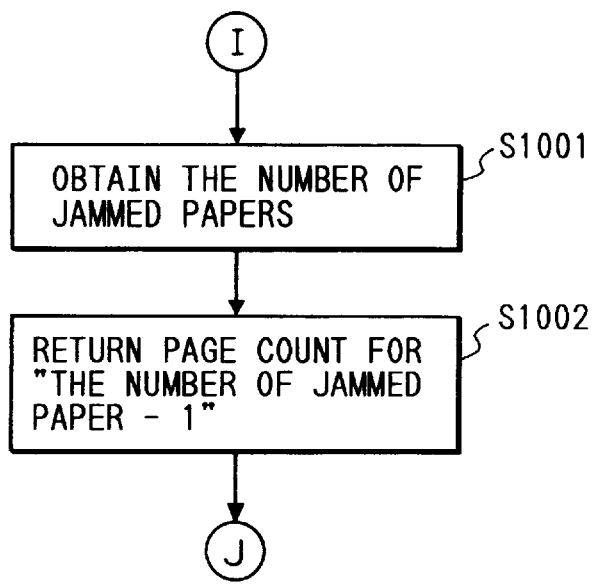
FIG. 15 is a flowchart showing the printing process in association with the selection of the optimum paper discharge port and the setting of the presence or absence of the jam recovery from the host computer after completion of the printing of all pages in the case where a jam occurs in the back-side printing mode and the jammed page is returned from the host computer in the embodiment 3.

A construction of the embodiment 3 is similar to that of the first embodiment except that a process for printing the pages excluded by the jam is added. A processing procedure at this time will now be described in accordance with the contents of the embodiment 1 on the basis of flowcharts of FIGS. 13 to 16 with reference to FIGS. 5 to 7. The flowcharts of FIGS. 13 to 15 are similar to the flowcharts of FIGS. 8 to 10, with certain changes.

Steps S801 to S806 in FIG. 13 relate to processes such that the page count is set to the first page, whether the printing mode is the front-side printing or back-side printing is set, the paper discharge port is set to the face-up tray in the front-side printing mode, and the paper discharge port is set to the face-down tray in the back-side printing mode. However, since they are similar to the embodiment 1, their descriptions are omitted here. In step S807, the CPU 401 judges whether the printing data of all pages has been printed and outputted. When the printing and output have been finished, the processing routine advances to a step of receiving the printing data of the jammed page from the host computer 201 shown in the flowchart of FIG. 16.

Step S808 in FIG. 13 relates to a process for developing the printing page of the relevant page into an image. Steps S901 to S906 in FIG. 14 relate to processes such that the developed image is transferred to the engine, the occurrence of a jam is detected, whether the jam recovery has been set or not is judged, whether the connection with the host computer is the two-way interface or not is judged, the number of jammed pages is detected from the engine, and the page numbers of the jammed pages are returned to the host computer in a manner similar to the embodiment 1.

Step S1300 in FIG. 14 relates to a process for receiving the printing data of the jammed pages from the host computer as will be explained hereinbelow. First, the page number obtained by subtracting "1" from the first page in which a jam occurred, namely, the page number of the front side is stored into the work memory 406 as a start jammed page. The last page in which a jam occurred is stored into the work memory 406 as an end jammed page. For example, in the case where a jam occurs in the fourth and sixth pages in FIG. 7, the paper on which the third and fourth pages are printed and the paper on which the fifth and sixth pages are printed are discharged. Therefore, the first page in which the jam occurred, namely, the third page obtained by subtracting "1" from the fourth page becomes the start jammed page. The last page in which the jam occurred, namely, the sixth page is set to the end jammed page. In this instance, a jam process flag is set to ON. The CPU 401 stores the jam process flag, start jammed page, and end jammed page into the work memory 406 as one set.

Figure 16:
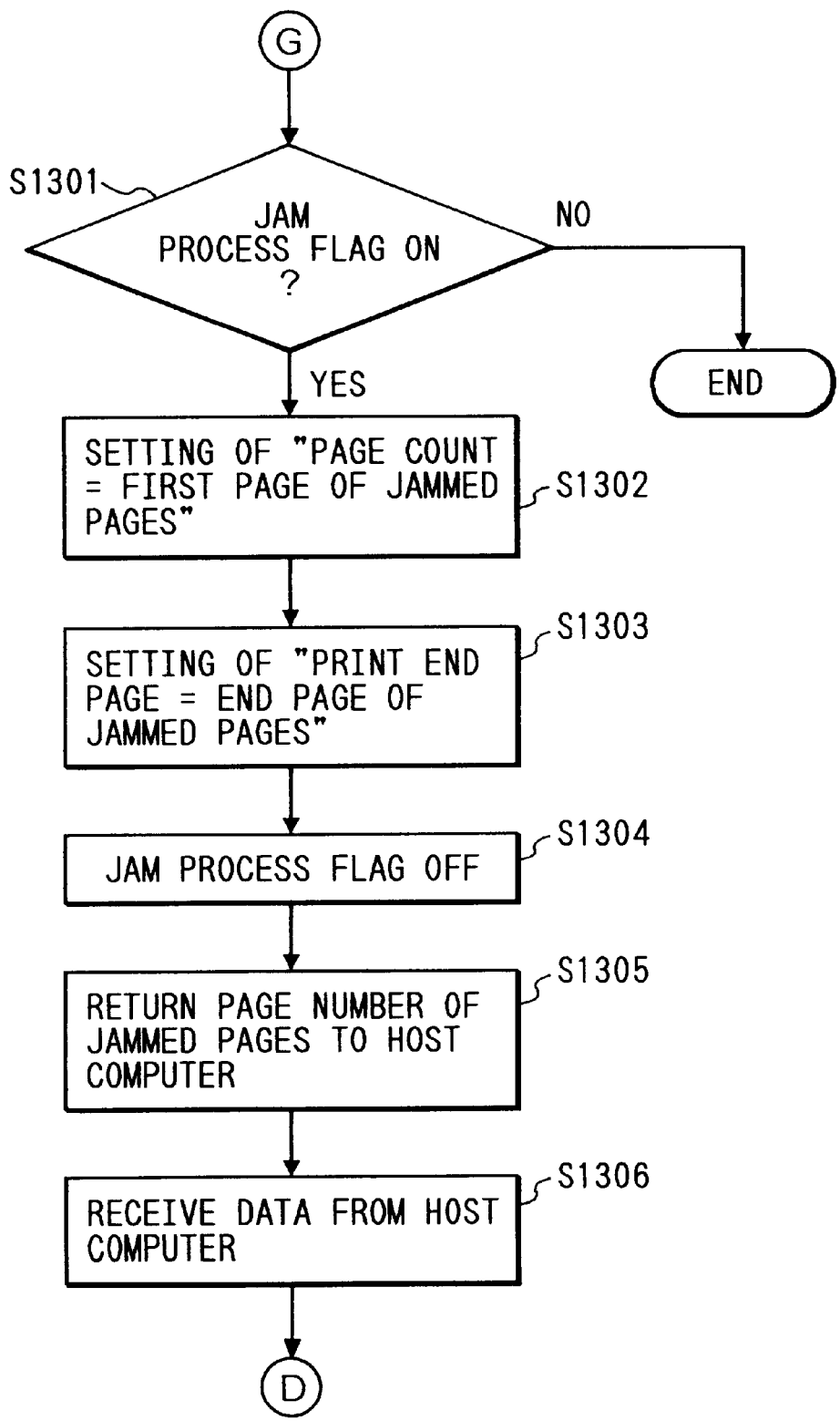
FIG. 16 is a flowchart showing a printing process in the case where a jam occurs in the back-side printing mode and the jammed page is returned from the host computer in the embodiment 3.

A processing procedure for receiving the printing data of the jammed pages from the host computer 201 will now be described with reference to the flowchart of FIG. 16. The CPU 401 reads out the jam process flag indicating whether the jammed pages still remain without finishing the processes or not from the work memory 406 with respect to each set. When there is a set in which the jam process flag is ON, the processing routine advances to the next step. When the flags with respect to all of the sets are OFF, the processing routine is finished. In this instance, when the front-side printing is designated, the CRT 201*d* displays a picture plane of FIG. 20, thereby promoting the user so as to reverse the printed paper upside down and to set the same. When the jam process is performed in the back-side printing mode designated, the CRT 201*d* displays a picture plane of FIG. 21. After completion of the printing process, the user is promoted so as to complete the printed papers arranged in a random order.

The "set" means a set of data indicative of a region where the jam occurred. The jam process flag, start jammed page, and end jammed page form one set. When the jam occurs a plurality of times, there is a set for each occurrence of the jam. Each set is stored into the work memory 406 (step S1301 in FIG. 16).

The page count is subsequently set to the start jam page, which will be explained hereinlater. This count setting operation is executed by writing into the work memory 406 by the CPU 401 (step S1302 in FIG. 16).

The page at which the printing process is finished is set to the end jammed page, which will be explained hereinlater. Such a setting operation is performed by writing into the work memory 406 by the CPU 401 (step S1303 in FIG. 16).

Subsequently, the CPU 401 sets the jam process flag in the work memory 406 to OFF (step S1304 in FIG. 16). The CPU 401 sends the data of the start jammed page and end jammed page to the host computer 201 (step S1305 in FIG. 16).

The CPU 401 subsequently receives the printing data from the host computer 201 (step S1306 in FIG. 16). The processing routine is returned to step S802 in FIG. 13. The CRT 201*d* displays the picture plane of FIG. 19, thereby informing the user of an operation to again print the jammed paper.

A process for transmitting the printing data of the jammed pages on the host computer 201 side to the printing apparatus 202 side will now be described with reference to the flowchart of FIG. 18. By the control of the printing apparatus 202 side in step S1305 in FIG. 16, when the CPU 201*a* receives a command to print the jammed page from the printing apparatus 202, the CPU 201*a* judges whether information indicative of a mode such that, after all of the printing data of the odd pages are transmitted, the printing data of the even pages is transmitted, is stored in the RAM 201*b* or not. When it is stored, the processes in the embodiment are executed. Such a mode is set by a method whereby the user side previously sets it from the keyboard 201*c*, or by a method whereby there is a command to judge whether there has been set a mode such that the printing apparatus has a both-sided printing mechanism, and after the odd page was printed, the even page is printed, or a mode such that the both-sided printing is executed in the printing apparatus having a one-side printing mechanism. This setting operation is performed prior to starting the flowcharts of FIGS. 8 and 13. The set information is stored into the RAM 201*b*.

Figure 18:
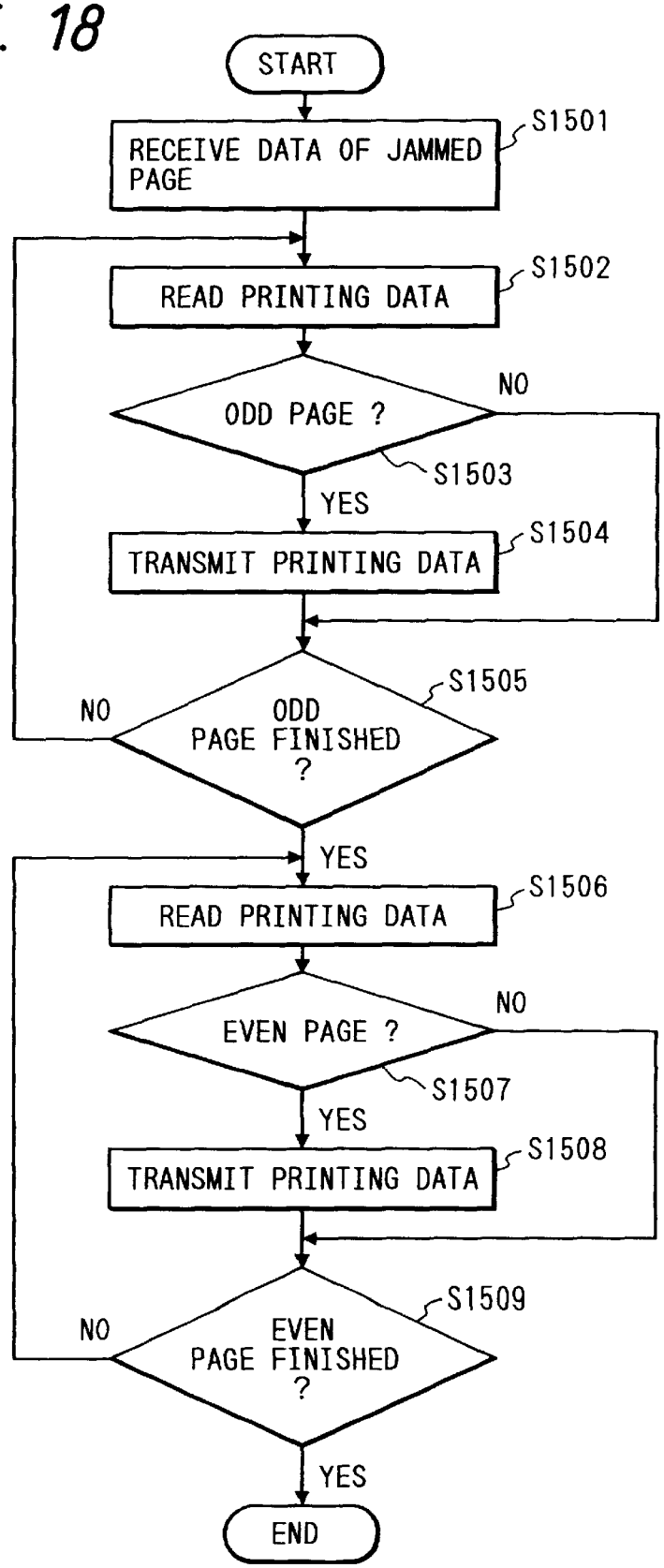
FIG. 18 is a flowchart showing a process in which the host computer transmits data of the jammed page to a printer in the case where a jam occurs in the back-side printing mode in the embodiment 3.

First, the CPU 201*a* stores the data of the start jammed page and the end jammed page into the RAM 201*b* as data of the page to be first outputted and the page to be outputted finally (step S1501 in FIG. 18).

The CPU 201*a* reads the printing data from the RAM 201*b* (step S1502 in FIG. 18).

Subsequently, the CPU 201*a* judges whether the printing data which was read out is the printing data of the odd page or not. If YES, the processing routine advances to the next step. If NO, step S1505 follows (step S1503 in FIG. 18).

The CPU 201*a* sends the read-out printing data to the controller unit 203 through the I/F circuit 201*e*. Thus, only the printing data of the odd page is sent (step S1504 in FIG. 18).

The CPU 201*a* judges whether the processes of the printing data of all of the odd pages have been finished. If NO, the processing routine is returned to step S1501. If YES, the processing routine advances to the next step and the processes of the printing data of the back side are executed (step S1505 in FIG. 18).

The CPU 201*a* reads out the printing data from the RAM 201*b* (step S1506 in FIG. 18).

The CPU 201*a* subsequently judges whether the read-out printing data is the printing data of the even page. If YES, the next step follows. If NO, step S1509 follows (step S1507 in FIG. 18).

The CPU 201*a* sends the read-out printing data to the controller unit 203 through the I/F circuit 201*e*. Thus, only the printing data of the even page is sent (step S1508 in FIG. 18).

Subsequently, the CPU 201*a* judges whether the processes of the printing data of all of the even pages have been finished. If NO, the processing routine is returned to step S1506. If YES, the processes on the host computer 201 side are finished (step S1509 in FIG. 18).

Thus, after the pages excluding the jammed pages were printed in the back-side printing mode without performing the jam recovery, the jammed pages can be newly printed as shown in the embodiment. Since the printer again calls the data from the host computer without performing the jam recovery, when printing, there is no need to store the data of all of the pages, particularly, the data of the odd pages into the memory in order to perform the jam recovery. A memory capacity of the printer can be minimized.

Figure 17:
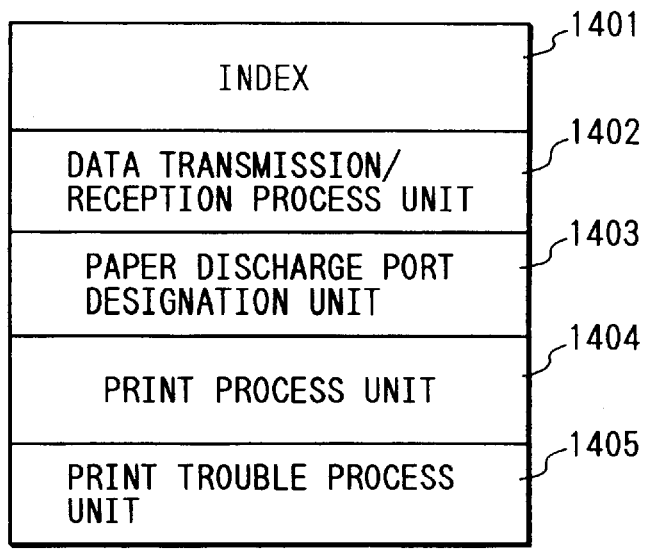
FIG. 17 is a memory map showing a construction of a memory medium for storing a processing procedure in the invention.

In embodiments 1, 2, and 3, so long as the function of the invention is executed, the invention can be obviously applied even to a sole apparatus, a system comprising a plurality of apparatuses, or a system in which the processes are executed through a network such as an LAN or the like. It will be obviously understood that the invention can be also applied to a case where a system or an apparatus is embodied by supplying the programs disclosed in FIGS. 8 to 16 to the RAM 406. FIG. 17 shows a memory map in case of supplying the program. Functions on the memory will now be described hereinbelow.

An index 1401 is a portion for handling which process unit corresponds to a command transmitted.

A data transmission/reception process unit 1402 executes a process for transmitting a command from the printer or host computer 201 by a two-way interface and receiving of printing data and commands from the host computer 201 side by the input data reception unit 101. A judgment regarding whether the communication with the host computer is a two-way communication or not in step S904, the transmission of the page numbers of the jammed pages to the host computer in steps S906 and S1305, and the reception of the data from the host computer in step S1306 are executed in the data transmission/reception process unit 1402.

A paper discharge port designation unit 1403 designates to which portion the paper is discharged after completion of the printing by the paper feeding/paper discharge and transfer control unit 106. The processes for setting the paper discharge port to the face-up tray or face-down tray in steps S803 and S805 are executed in the paper discharge port designation unit 1403.

A print process unit 1404 handles a printing process such as management of the print pages and actual output process by the input data analysis unit 102, printing data development unit 103, and video data transfer unit 104. The print process unit 1404 also judges the front side or back side and executes the printing process corresponding to the front or back side. The following processes are also executed in the print process unit 1404: the judgment about the end of the printing process in step S807; the development of the printing data into the image in step S808; the transfer of the developed data to the engine in step S809; the processes for page counting in steps S801, S907, S1302, and S1303; the inputting process of the printing data in steps S1101 and S1103; the judgment about the end of one page in step S1102; the judgment about whether the front-side printing has been designated or not in step S1104; the judgment regarding whether the print page is the odd page or even page in steps S1105 and S1201; and the conversion of the printing data into the intermediate codes in steps S1106 and S1202.

In a print trouble process unit 1405, when a print trouble such as a jam or the like occurs during the printing, a print trouble recovery process such as a jam recovery or the like is performed by the jam recovery unit 107 or a non-print trouble recovery process for processing the remaining print pages without performing the jam recovery or the like is executed. In the print trouble process unit 1405, the following processes are executed: namely, the setting of the jam recovery in step S804; the setting of no jam recovery in step S806; the judgment about the occurrence of the jam in step S902; the judgment about whether the jam recovery is executed or not in step S903; the detection of the number of jammed pages in steps S905 and S1001; the detection of the jammed pages in step S906; the return of the page counter in step S1002; and the judgment and process of the jam process flag in steps S1301 and S1304.

In this case, the memory medium in which the programs regarding the invention have been stored constructs the invention. By reading the programs from the memory medium to the system or apparatus, the system or apparatus operates by a predetermined method.

Figures 21, 22:
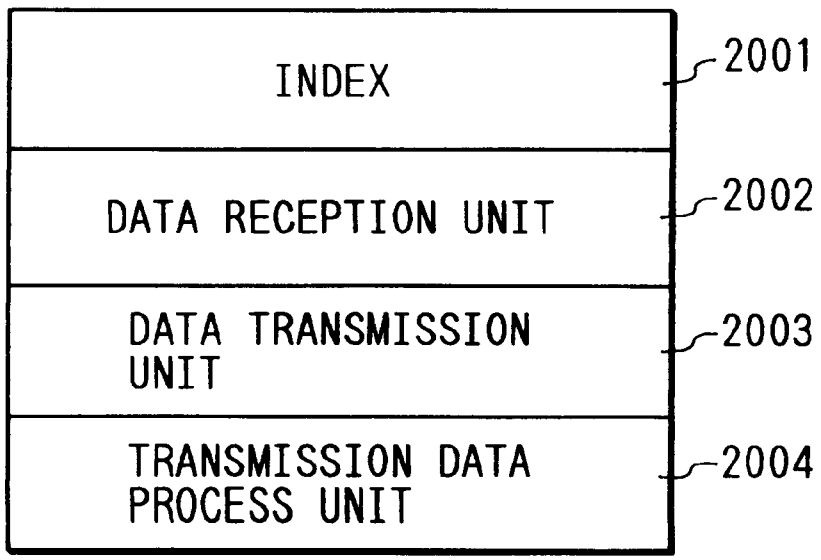
FIG. 21 shows a display picture plane after the jammed page was printed in the embodiment 3.
FIG. 22 is a memory map showing a construction of a memory medium in which a processing procedure on the host computer side in the case where a jam occurs in the back-side printing mode in the embodiment 3.

Similarly, the invention can be also obviously applied to a case where it is embodied by supplying the program for processes on the host computer 201 side shown in FIG. 18 to the RAM 201b from the FD 209. FIG. 22 shows a memory map in the case of supplying the program and functions on the memory, will now be described hereinbelow.

An index 2001 is a portion to handle which process unit corresponds to a command transmitted.

A data reception unit 2002 executes a process for receiving the command from the controller unit 203 by the two-way interface. The reception of the data of the jammed pages in step S1501 is executed in the data reception unit 2002.

A data transmission unit 2003 performs the transmission of data to the controller unit 203. The transmission of the printing data in steps S1504 and S1508 is executed in the data transmission unit 2003.

A transmission data process unit 2004 performs the process of the printing data to be transmitted. The reading operation of the printing data from the RAM 201b in steps S1502 and S1506, the classification of the printing data of the odd pages and even pages in steps S1503 and S1507, and the judgment about whether the processes of the printing data of the odd pages and even pages in steps S1505 and S1509 have been finished or not, are executed in the transmission data process unit 2004.

In the embodiment, the printing apparatus using the electrophotography process has been presumed as a printing mechanism. However, it will be obviously understood that the invention is also effective to any other printers (ink jet, serial, etc.) so long as it is a page printer for performing the printing process on a page unit basis irrespective of the kind of printing mechanism.

What is claimed is:

1. A print control apparatus which receives front-side data and back-side data from an external apparatus and which causes a printer to print the received front-side and back-side data on front and back sides of a recording medium, respectively, said print control apparatus comprising:

detection means for detecting a jam in the printer; and control means for executing a jam recovery function if said detection means detects a jam during printing on the front side, and executing no jam recovery function if said detection means detects a jam during printing on the back side.

2. A print control apparatus according to claim 1, wherein the jam recovery function is to allow an operator of the printer to remove a recording medium in which the jam occurred and then automatically print the received front-side data on a new recording medium.

3. A print control apparatus according to claim 1, wherein when said detection means detects a jam during printing on the back side, said control means requests the external apparatus to send the back-side data again.

4. A print control apparatus according to claim 2, further comprising port setting means for setting a recording medium discharge port as face up when a front-side print mode is designated and as face down when a back-side print mode is designated.

5. A print control apparatus according to claim 2, further comprising jam recovery setting means for setting the jam recovery function as valid when a front-side print mode is designated and as invalid when a back-side print mode is designated.

6. A print control method for controlling an apparatus which receives front-side data and back-side data from an external apparatus and which causes a printer to print the received front-side and back-side data on front and back sides of a recording medium, respectively, said method comprising the steps of:

detecting a jam in the printer; and executing a jam recovery function if said detection step detects a jam during printing on the front side, and executing no jam recovery function if said detection step detects a jam during printing on the back side.

7. A print control method according to claim 6, wherein the jam recovery function is to allow an operator of the printer to remove a recording medium in which the jam occurred and then automatically print the received front-side data on a new recording medium.

8. A print control method according to claim 6, wherein when said detection step detects a jam during printing on the back side, said executing step requests the external apparatus to send the back-side data again.

9. A print control method according to claim 7, further comprising a step of setting a recording medium discharge port as face up when a front-side print mode is designated and as face down when a back-side print mode is designated.

10. A print control method according to claim 7, further comprising a step of setting the jam recovery function as valid when a front-side print mode is designated and as invalid when a back-side print mode is designated.

11. A machine-readable memory medium for storing program codes to control an apparatus which receives front-side data and back-side data from an external apparatus and which causes a printer to print the received front-side and back-side data on front and back sides of a recording medium, respectively, said medium comprising program codes for controlling the apparatus to perform the steps of:
    detecting a jam in the printer; and
    executing a jam recovery function if said detection step detects a jam during printing on the front side, and executing no jam recovery function if said detection step detects a jam during printing on the back side.

12. A memory medium according to claim 1, wherein the jam recovery function is to allow an operator of the printer to remove a recording medium in which the jam occurred and then automatically print the received front-side data on a new recording medium.

13. A memory medium according to claim 1, wherein when said detection step detects a jam during printing on the back side, said executing step requests the external apparatus to send the back-side data again.

14. A memory medium according to claim 2, further comprising program codes for controlling the apparatus to perform a step of setting a recording medium discharge port as face up when a front-side print mode is designated and as face down when a back-side print mode is designated.

15. A memory medium according to claim 12, further comprising program codes for controlling the apparatus to perform a step of setting the jam recovery function as valid when a front-side print mode is designated and as invalid when a back-side print mode is designated.

16. A print control apparatus according to claim 1, wherein said control means requests the external apparatus to send the front-side data again if said detection means detects a jam during printing on the back side.

17. A print control apparatus according to claim 1, wherein said control means requests the external apparatus to send the front-side and back-side data again if said detection means detects a jam during printing on the back side.

18. A print control apparatus according to claim 1, wherein the printer comprises a one-side printer.

19. A print control apparatus according to claim 1, wherein said control means causes the printer to print next back-side data on a next recording medium if said detection means detects a jam during printing on the back side.

20. A print control apparatus according to claim 17, wherein said control means causes the printer finally to print the front-side and back-side data sent by the external apparatus in response to the request by said control means.

21. A print control method according to claim 6, wherein said executing step further comprises the step of requesting the external apparatus to send the front-side data again if a jam is detected in said detecting step during printing on the back side.

22. A print control method according to claim 6, wherein said executing step further comprises the step of requesting the external apparatus to send the front-side and back-side data again if a jam is detected in said detecting step during printing on the back side.

23. A print control method according to claim 6, wherein the printer comprises a one-side printer.

24. A print control method according to claim 6, wherein said executing step further comprises the step of causing the printer to print next back-side data on a next recording medium if a jam is detected in said detecting step during printing on the back side.

25. A print control method according to claim 22, wherein said executing step further comprises the step of causing the printer finally to print the front-side and back-side data sent by the external apparatus in response to the request made in said requesting step.

26. A memory medium according to claim 11, wherein said executing step further comprises the step of requesting the external apparatus to send the front-side data again if a jam is detected in said detecting step during printing on the back side.

27. A memory medium according to claim 11, wherein said executing step further comprises the step of requesting the external apparatus to send the front-side and back-said data again if a jam is detected in said detecting step during printing on the back side.

28. A memory medium according to claim 11, wherein the printer comprises a one-side printer.

29. A memory medium according to claim 11, wherein said executing step further comprises the step of causing the printer to print next back-side data on a next recording medium if a jam is detected in said detecting step during printing on the back side.

30. A memory medium according to claim 27, wherein said executing step further comprises the step of causing the printer finally to print the front-side and back-side data sent by the external apparatus in response to the request made in said requesting step.

31. A machine-readable memory medium for storing program codes to control an apparatus which receives front-side and back-side data from an external apparatus and which causes a printer to print the received front-side and back-side data on front and back sides of a recording medium, respectively, said program codes controlling the apparatus to perform the step of:
    executing a jam recovery function if a jam occurs during printing on the front side, and executing no jam recovery function if a jam occurs during printing on the back side.

32. A memory medium according to claim 31, wherein the jam recovery function is to allow an operator of the printer to remove a recording medium in which the jam occurred and then automatically print the received front-side data on a new recording medium.

33. A memory medium according to claim 31, wherein when a jam occurs during printing on the back side, said executing step further comprises the step of requesting the external apparatus to send the back-side data again.

34. A memory medium according to claim 32, further comprising program codes for controlling the apparatus to perform a step of setting a recording medium discharge port as face-up when a front-side print mode is designated and as face-down when a back-side print mode is designated.

35. A memory medium according to claim 32, further comprising program codes for controlling the apparatus to perform a step of setting the jam recovery function as valid when a front-side print mode is designated and as invalid when a back-side print mode is designated.

36. A memory medium according to claim 31, wherein said executing step further comprises the step of requesting the external apparatus to send the front-side data again if a jam occurs during printing on the back side.

37. A memory medium according to claim 31, wherein said executing step further comprises the step of requesting the external apparatus to send the front-side and back-side data again if a jam occurs during printing on the back side.

38. A memory medium according to claim 31, wherein the printer comprises a one-side printer.

39. A memory medium according to claim 31, wherein said executing step further comprises the step of causing the printer to print next back-side data on a next recording medium if a jam occurs during printing on the back side.

40. A memory medium according to claim 37, wherein said executing step further comprises the step of causing the printer finally to print the front-side and back-side data sent by the external apparatus in response to the request made in said requesting step.

* * * * *

UNITED STATES PATENT AND TRADEMARK OFFICE
CERTIFICATE OF CORRECTION

PATENT NO. : 6,006,012

DATED : December 21, 1999

INVENTOR(S): MASAAKI SHIMIZU

Page 1 of 2

It is certified that error appears in the above-identified patent and that said Letters Patent is hereby corrected as shown below:

Column 1

Line 25, "a" should be deleted.
Line 30, "a" (second occurrence) should be deleted.

Column 2

Line 4, "computer;" should read --computer,--.

UNITED STATES PATENT AND TRADEMARK OFFICE
CERTIFICATE OF CORRECTION

PATENT NO. : 6,006,012

DATED : December 21, 1999

INVENTOR(S): MASAAKI SHIMIZU  Page 2 of 2

It is certified that error appears in the above-identified patent and that said Letters Patent is hereby corrected as shown below:

Column 7

Line 32, "ROM" should read --a ROM--.
    Line 35, "ROM" should read --a ROM--.
    Line 39, "an" should read --a--.
    Line 44, "RAM" should read --a RAM--.
    Line 61, "RAM" should read --a RAM--.

Column 15

Line 23, "claim 1," should read --claim 11,--.
    Line 28, "claim 1," should read --claim 11,--.
    Line 32, "claim 2," should read -- claim 12,--.

Signed and Sealed this

Fifteenth Day of May, 2001

*Attest:*

NICHOLAS P. GODICI

*Attesting Officer*  Acting Director of the United States Patent and Trademark Office